United States Patent [11] 3,545,546

[72] Inventors Harry Surkalo
 Findlay, Ohio;
 Marion O. Son, Jr., Littleton, Colorado
[21] Appl. No. 812,366
[22] Filed April 1, 1969
[45] Patented Dec. 8, 1970
[73] Assignee Marathon Oil Company
 Findlay, Ohio
 a corporation of Ohio

[54] FLUID DESIGN FOR WELL STIMULATION APPLICATIONS
 12 Claims, No Drawing
[52] U.S. Cl. ........................................................ 166/305
[51] Int. Cl. ...................................................... E21b 43/25
[50] Field of Search ............................................. 166/305,
 274, 273, 275, 306, 263, 311, 312

[56] References Cited
UNITED STATES PATENTS
| | | | |
|---|---|---|---|
| 2,331,594 | 10/1943 | Blair, Jr. ........................ | 252/8.55 |
| 2,356,205 | 8/1944 | Blair, Jr., et al. ............... | 252/8.55 |
| 2,369,831 | 2/1945 | Jones et al. ..................... | 252/8.55 |
| 3,126,952 | 3/1964 | Jones ............................. | 166/305UX |
| 3,185,217 | 5/1965 | Brooks, Jr., et al. ............ | 166/305X |
| 3,354,953 | 11/1967 | Morse ........................... | 166/305UX |
| 3,402,770 | 9/1968 | Messenger ...................... | 166/305 |
| 3,467,188 | 9/1969 | Gogarty .......................... | 166/274 |
| 3,474,865 | 10/1969 | Gogarty et al. ................ | 166/274 |
| 3,477,511 | 11/1969 | Jones et al. ..................... | 166/274 |

Primary Examiner—Stephen J. Novosad
Attorneys—Joseph C. Herring, Richard C. Willson, Jr. and Jack L. Hummel ABSTRACT: Stimulation of a permeable, oil-bearing subterranean formation is effected by designing a micellar dispersion to have a mobility at least about two times the mobility of the combination of water and oil connate to the reservoir, then injecting from about 0.1 to about 10 barrels per vertical foot of oil bearing formation of the micellar dispersion into the formation and then injecting drive water to displace the micellar dispersion out into the formation.

FLUID DESIGN FOR WELL STIMULATION APPLICATIONS

BACKGROUND OF THE INVENTION

Basic design concepts of stimulating wells is to design the stimulation fluid to have a mobility that is equal to or less than that of the connate fluids within the subterranean formation. This design concept permits the stimulation fluid to push out ahead of it the connate fluids and possibly rewet the reservoir rock to the desired oil wetness or water wetness. However, the drive fluid which displaces the stimulation fluid has a high mobility since it is usually water or a low molecular weight hydrocarbon. Thus, a very unfavorable mobility control is effected at the juncture of the back portion of the stimulation fluid and the drive fluid; such may cause severe fingering and inefficient displacement of the stimulation agent out into the formation.

Applicants have discovered a novel design concept of stimulating injection wells with a micellar dispersion wherein the micellar dispersion is designed to have a mobility substantially greater than the combined mobility of the oil and water within the subterranean formation. The designed mobility of the micellar dispersion is preferably closer to the mobility of the drive water than to the mobility of the combination of connate fluids, i.e. connate water and connate hydrocarbon. By such a design concept, the drive fluid can more effectively displace the micellar dispersion out into the formation and accomplish stimulation of the permeable formation.

DESCRIPTION OF THE INVENTION

The term "micellar dispersion" as used herein is meant to include micellar solutions, microemulsions, "transparent emulsions" (Blair, Jr. et al. U.S. Pat. No. 2,356,205), aqueous soluble oils, and micellar solution technology taught in C. G. Sumner Clayton's, The Theory of Emulsions and Their Technical Treatment, Fifth Edition, pages 315—320, (1954). Specific examples of useful micellar solutions include those defined in U.S. Pat. Nos. 3,254,714 and 3,275,075 to Gogarty et al. and 3,307,628 to Sena. The art recognizes the differences between micellar dispersion technology and emulsion technology, one of the major differences being that the equilibrium of the micellar dispersion tends towards further dispersion of the internal phase whereas the equilibrium of an emulsion tends toward coalescence of the internal phase.

The micellar dispersion is composed of hydrocarbon, aqueous medium, and surfactant. Cosurfactant(s) and electrolyte(s) can optionally be incorporated within the micellar dispersion. Examples of volume amounts include from about 4 percent to about 60 percent or more of hydrocarbon, from about 20 percent or less to about 90 percent of aqueous medium, at least about 4 percent surfactant, about 0.01 to about 20 percent cosurfactant (also identified as cosolubilizer and semipolar organic compound) and from about 0.001 to about 5 percent or more (weight percent based on aqueous medium) of electrolyte. Optionally, other components compatible with the micellar dispersion can be incorporated to impart desired characteristics to the micellar dispersion.

The micellar dispersion can be oil-external or water-external. A particularly useful dispersion is an oil-external micellar dispersion having the capability of a large uptake of water and exhibiting lower viscosities upon the addition of water.

Hydrocarbons useful with the micellar dispersion include crude oil, partially refined fractions of crude oil, refined fractions of crude oil, and like materials. Specific examples include crude column overheads, side cuts from crude columns, gas oils, kerosenes, heavy naphtha, naphthas, straight run gasoline, liquefied petroleum gases, propane, pentane, heptane, cyclohexane, aryl compounds, substituted aryl compounds, etc. Preferably, the hydrocarbon can be characteristic of the hydrocarbon connate to the particular formation being treated, i.e. the physical makeup of the hydrocarbon can be very similar to the physical makeup of the connate hydrocarbon. The unsulfonated hydrocarbon within petroleum sulfonate, e.g. unsulfonated gas-oils, are also useful as the hydrocarbon.

The aqueous medium can be a soft water, a brine water, or a brackish water. Where aqueous medium does contain ions, it is preferred that the ions are compatible with the ions in the connate water.

Surfactants useful with the micellar dispersion include anionic, nonionic, and cationic surfactants. Specific examples of surfactant include those found in U.S. Pat. No. 3,254,714. Other useful surfactants include Duponol WAQE (a 30 percent active sodium lauryl sulfate marketed by DuPont Chemical Corporation, Wilmington, Delaware), Energetic W–100 (a polyoxyethylene alkyl phenol marketed by Armour Chemical Company, Chicago, Illinois), Triton X–100 (an alkylphenoxy polyethoxy ethanol marketed by Rohm & Haas, Philadelphia, Pennsylvania) and Arquad 12—50 (a 50 percent active dodecyl trimethyl ammonium chloride marketed by Armour Chemical Company, Chicago, Illinois), and like materials.

Preferably, the surfactant is a petroleum sulfonate, also known as alkyl aryl naphthenic sulfonate. A particularly useful sulfonate is one having an average equivalent weight within the range of from about 360 to about 520 and contains a monovalent cation, e.g. sodium or ammonium petroleum sulfonate. More preferably, the equivalent weight of the sulfonate can be 400 to about 450. In addition, the surfactant can be a combination of two or more surfactants, and can be a mixture of low, medium and high equivalent weight sulfonates having an average equivalent weight within the above-indicated ranges.

Cosurfactants useful with the invention include alcohols, amino compounds, esters, ketones, aldehydes and like materials containing from one to about 20 or more carbon atoms. Preferably the surfactant contains from about three to about 16 carbon atoms and specific examples include isopropanol, n- and iso- butanol, amyl alcohols such as n-amyl alcohol, 1- and 2-hexanol, 1-and 2 -octanol, decylalcohols, dodecylalcohols, alkaryl alcohols such as p-nonylphenol and alcoholic liquors such as fusel oil, and like materials, Preferably, the cosurfactant can be present in concentrations within the range of from about 0.1 to about 5 percent. Mixtures of two or more cosurfactants are useful as are two or more different cosurfactants within the same class of cosurfactants, i.e. amyl and 1-hexanol and optionally p-nonyl phenol.

Electrolytes useful in the invention include inorganic salts, inorganic bases, inorganic acids, organic acids, organic bases, and organic salts. Preferably, the electrolyte is one compatible with the sands within the subterranean formation. Specific examples of electrolytes include sodium hydroxide, sodium chloride, sodium sulfate, hydrochloric acid, sulfuric acid, and those electrolytes taught in U.S. Pat. Nos. 3,330,343 to Tosch et al. and 3,297,084 to Gogarty et al. The electrolytes can be the salts or ions within the aqueous medium, i.e. within the brine or brackish waters. The type and concentration of electrolyte will depend on the aqueous medium, surfactant, cosurfactant, hydrocarbon, and the reservoir conditions, including temperature of the reservoir.

The mobility of the micellar dispersion should be substantially larger than that of the connate fluids, e.g. the mobility of the micellar dispersion can be at least about two times (200 percent) larger than the combined mobility of the water and oil within the subterranean formation. More preferably, the mobility of the micellar dispersion is at least 300 percent larger than that of the connate fluids. It can have a mobility approaching that of the mobility of the drive fluid, e.g. drive water or hydrocarbon drive fluid, which is injected behind the micellar dispersion.

Work resulting form well stimulation studies indicate that the approach of complete mobility control may not be the correct design criteria for stimulating processes. Applicants have found that it is better to have the slug mobility higher than that of the mobility of the connate oil and water, thus more closely matched to the drive fluid mobility. For practical purposes, and for example only, this means that if the apparent viscosity of the connate oil and water is 30 cp., then the slug viscosity for stimulation should be about 10 cp. Such a design permits the drive water to more efficiently propagate the micellar dispersion out into the formation to stimulate the formation to the flow of fluids.

Stimulation of the formation can be obtained by injecting through an injection means, e.g. a well in fluid communication with the formation, from about 0.1 less to about 10 or more barrels of the micellar dispersion per vertical foot of the formation. Larger amounts can be injected, however, it may be economically unattractive for the results obtained. Preferably, from about 1 to about 5 barrels per vertical foot of the formation to be stimulated of the micellar dispersion can be injected to give good results. After the micellar dispersion is injected into the formation, sufficient drive fluid, e.g. drive water, is injected to displace the dispersion out into the formation, preferably out to a distance of at least about 7 to 15 feet.

The following examples are presented to teach specific working embodiments of the invention and should not be interpreted to limit in any way the scope of the invention. Further, all equivalents obvious to those skilled in the art are to be equated within the scope of the invention as identified within the specification and appended claims. Unless otherwise specified, all percents are based on volume.

EXAMPLE 1

Core samples taken from the Curtis Field in Wyoming are flooded in the following manner. The cores are 1 inch in diameter and 3 inches long and are encapsulated in epoxy. Five core samples are tested for their relative permeabilities to the flow of water at residual oil, i.e. before stimulation (this is referred to as KRWI), and thereafter the KRWF (relative permeability to flow of water after stimulation) is determined after the samples are treated by this invention. The viscosity of the stimulation fluid is indicated in table I as is also the ratio of KRWF/KRWI. The pore volume of the stimulation fluid injected is 1.0 pore volumes of the micellar dispersion and the pore volume of the drive water is 4.5 pore volumes. The micellar dispersion is samples A, B, and C are composed of:

| | | Percent |
|---|---|---|
| 1 | Sodium petroleum sulfonate (Petronate HL, a tradename of Sonneborn Chemical Co., 300 Park Avenue South, New York, N.Y. 10010, having an average molecular weight of about 440-470). | 6.88 |
| 2 | Sodium sulfonate (Pyronate 50, a tradename of Sonneborn Chemical Co., having an average molecular weight of 350-375). | 4.58 |
| 3 | Kerosene | 40.23 |
| 4 | Water (distilled water) containing 0.25 weight percent of NaCl. | 47.35 |
| 5 | Primary amyl alcohol | [1] 0.72 |

[1] Ml. per 100 ml. of micellar dispersion.

Samples D and E are flooded with the micellar dispersion having the above composition except there is present 0.95 ml. of primary amyl alcohol per 100 ml. of micellar dispersion slug. The cores are flooded at 100° F. at constant flow rates. Table I contains data indicating results of the test:

TABLE I

| | KRWF/KRWI | Viscosity of stimulating fluid at 100° F. |
|---|---|---|
| Sample Number: | | |
| A | 0.31 | 42 |
| B | 1.6 | 42 |
| C | 0.8 | 42 |
| D | 2.7 | 18 |
| E | 2.8 | 18 |

The above date clearly indicates that the higher viscosity stimulation fluids give a lower KRWF/KRWI ratio whereas a lower viscosity stimulation fluid gives a higher ratio, thus an improvement in stimulation.

EXAMPLE 2

Core samples (from Oregon Basin, Wyoming) 1 inch in diameter by 3 inches long are encapsulated in epoxy. The procedure of example 1 is repeated except the amount of the primary amyl alcohol is adjusted in the micellar dispersion to give the indicated viscosities outlined in table II. Table II indicates the results obtained.

TABLE II

| | KRWF/KRWI | Viscosity of stimulation fluid at 100° F. |
|---|---|---|
| Sample Number: | | |
| F | 3.8 | 42 |
| G | 3.9 | 25 |
| H | 5.2 | 18 |
| I | 7.5 | 18 |
| J | 8.2 | 18 |

EXAMPLE 3

Core samples taken from the Darwin Sand in Wyoming are tested. The samples are 1 inch in diameter and 3 inches long and are encapsulated in epoxy and are treated as described in example 1. Indicated viscosities of the micellar dispersion are obtained by adjusting the primary amyl alcohol within the micellar dispersion. Table III indicates that better stimulation is obtained by matching the mobility of the micellar dispersion closer to the water than that of the connate fluids in the core:

TABLE III

| | KRWF/KRWI | Viscosity of stimulation fluid at 100° F |
|---|---|---|
| Sample Number: | | |
| K | 1.3 | 42 |
| L | 3.3 | 18 |
| M | 3.0 | 18 |

We claim:
1. A method of increasing the injectivity index of a subterranean formation in communication with an injection means, comprising:
  1. injecting through the injection means from about 0.1 to about 10 barrels of a micellar dispersion per vertical foot of formation to be stimulated wherein the micellar dispersion is characterized as having a mobility substantially larger than that of the mobility of the connate fluids in the subterranean formation; and
  2. injecting sufficient drive fluid to displace the micellar dispersion out into the formation.

2. The method of claim 1 wherein from about 1 to about 5 barrels of the micellar dispersion per vertical foot of hydrocarbon-bearing formation is injected into the formation.

3. The method of claim 1 wherein the micellar dispersion is comprised of hydrocarbon, surfactant, and water.

4. The method of claim 3 wherein the micellar dispersion contains cosurfactant.

5. The method of claim 3 wherein the micellar dispersion contains electrolyte.

6. The method of claim 1 wherein the mobility of the micellar dispersion is at least about two times as large as the mobility of the combination of connate water and oil in the formation to be stimulated.

7. The method of claim 1 wherein the mobility of the micellar dispersion is at least about three times larger than the combined mobility of the connate fluids within the subterranean formation.

8. The method of claim 1 wherein sufficient drive water is injected into the formation to displace the micellar dispersion out to a radius of at least about 7 to 15 feet.

9. The method of increasing the injectivity index of a subterranean formation in communication with an injection means comprising:
1. injecting through the injection means into the formation from about 0.1 to about 10 barrels per vertical foot of hydrocarbon-bearing formation of a micellar dispersion wherein the micellar dispersion has a mobility about two times larger than the mobility of the connate fluids in the subterranean formation; and,
2. injecting sufficient drive water to displace the micellar dispersion out into the formation to a distance of at least about 7 to 15 feet in radius from the well bore.

10. The method of claim 9 wherein the micellar dispersion is comprised of hydrocarbon, surfactant, water, and cosurfactant.

11. The method of claim 10 wherein the micellar dispersion contains electrolyte.

12. The method of claim 9 wherein the mobility of the micellar dispersion is closer to the mobility of the drive water than the mobility of the connate fluids within the subterranean formation.